Patented Apr. 3, 1923.

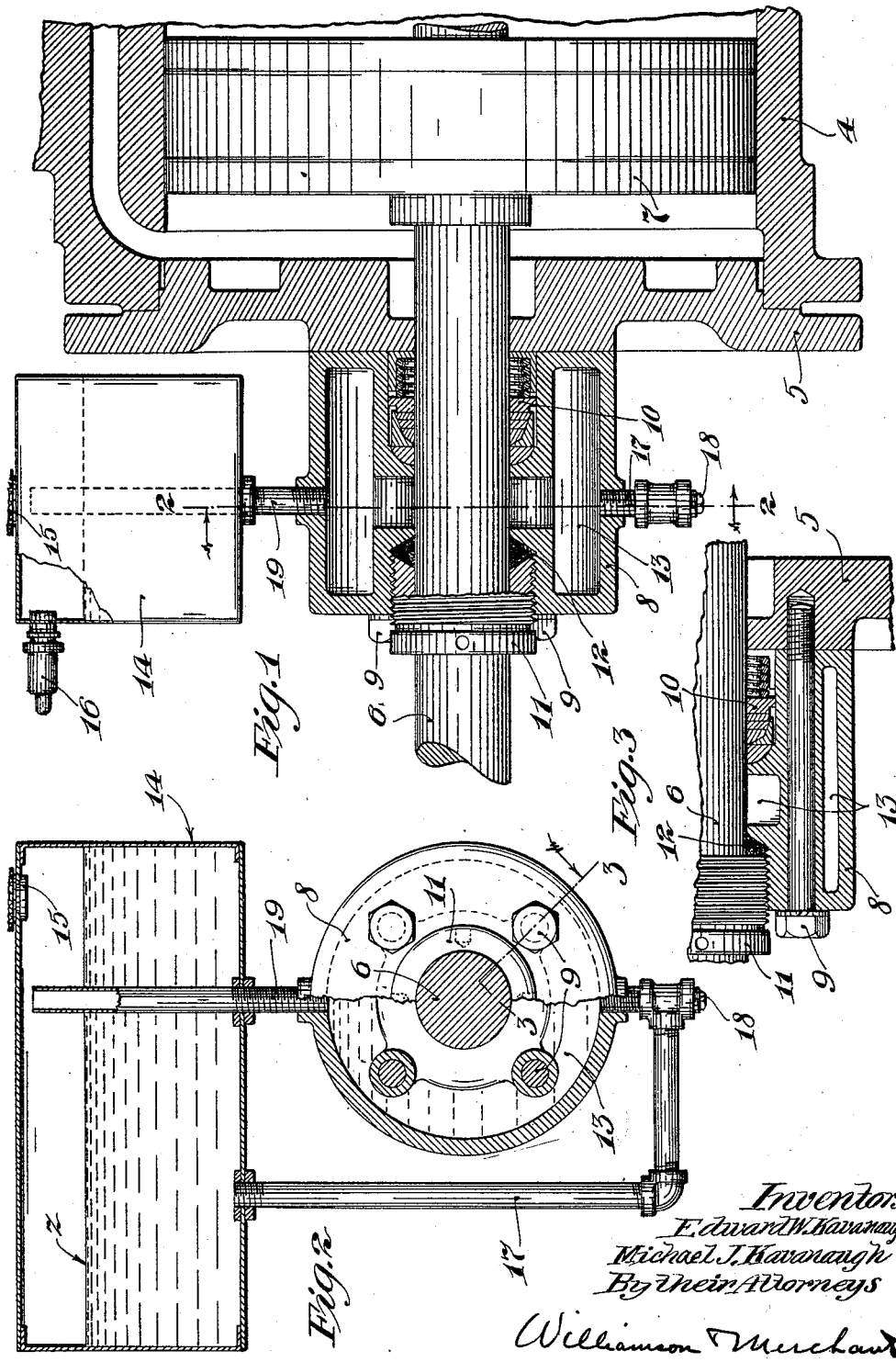

1,450,421

UNITED STATES PATENT OFFICE.

EDWARD W. KAVANAUGH AND MICHAEL J. KAVANAUGH, OF MINNEAPOLIS, MINNESOTA.

STUFFING BOX AND THE LIKE.

Application filed May 15, 1919. Serial No. 297,313.

*To all whom it may concern:*

Be it known that we, EDWARD W. KAVANAUGH and MICHAEL J. KAVANAUGH, citizens of the United States, residing at Minneapolis, in the county of Hennepin and State of Minnesota, have invented certain new and useful Improvements in Stuffing Boxes and the like; and they do hereby declare the following to be a full, clear, and exact description of the invention, such as will enable others skilled in the art to which it appertains to make and use the same.

Our invention relates to improvements in stuffing boxes and the like, and has for its object to provide the same with a steam condensing chamber; and, to this end, it consists of the novel devices and combinations of devices hereinafter described and defined in the claims.

In the accompanying drawings, which illustrate the invention, like characters indicate like parts throughout the several views.

Referring to the drawings:—

Fig. 1 is a view partly in elevation and partly in central section, illustrating the invention applied to a steam cylinder and the rod of its piston;

Fig. 2 is a view principally in section, taken on the line 2—2 of Fig. 1; and

Fig. 3 is a detail view with some parts sectioned on the line 3—3 of Fig. 2.

The numeral 4 indicates one of the cylinders of a steam engine, and the numeral 5 indicates the head thereof, through which works the rod 6, of a piston 7. A stuffing box 8 is detachably secured to the cylinder head 5 by a plurality of circumferentially spaced bolts 9. In the inner end of the stuffing box 8 is a metallic packing 10, which surrounds the piston rod 6 and is compressed between the cylinder head 5 and said stuffing box. A gland 11, in the outer end of the stuffing box 8, through which the piston rod 6 also projects, compresses a suitable packing 12, onto the piston rod 6 and stuffing 8. Within the stuffing box 8 is a primary steam-condensing chamber 13, which is open to the piston rod 6 between the packings 10 and 12.

Located above the stuffing box 8 is a secondary expansion chamber or tank 14, having a filling opening normally closed by a screw cap 15, and also having a blow-off valve 16. A pipe 17 connects the bottom of the chamber 13 with the bottom of the tank 14 to afford communication therebetween, and has, at its lowermost point, a drain plug 18. Leading from the top of the chamber 13 is a steam pipe 19, which extends through the bottom of the tank 14 and above the liquid level Z therein. The liquid in the tank 14 may be either an accumulation of water, due to condensation of steam escaping between the piston rod 6 and the packing 10, or part water and part oil, said oil being placed therein for the purpose of lubricating the piston rod.

By the use of our improved stuffing box, all steam escaping between the piston rod and packing 10 will enter the chamber 13 and either be condensed there, depending on the amount of liquid therein, or it may pass upward through the pipe 19 and be condensed in the tank 14. By thus trapping the escaping steam, the packing 12 remains tight and prevents the escape of steam thereof, which is highly objectionable for various reasons, one of which is that it obstructs the view of an engineer on an engine. The trapped steam, when condensed, also acts as a lubricant for the piston rod and thus prolongs the life of the same as well as the life of the packing.

What we claim is:—

1. The combination with a cylinder and a piston, of a stuffing box having inner and outer packings through which the piston rod works, a chamber between said packing open to the piston rod having communication with said cylinder only by leakage through the inner packing and means for keeping said chamber constantly full of water and for condensing steam which escapes into said chamber from said cylinder.

2. The combination with a cylinder and piston, of a stuffing box attached to the head of the cylinder and having inner and outer packings through which the piston rod works, said stuffing box having a chamber open to the piston rod between the packings, said cylinder having communication with the chamber only by leakage through the inner packing, a condensing tank, a supply conduit between the chamber and tank, and a steam pipe leading from the chamber to the tank above the liquid level therein.

3. The combination with a cylinder and a piston, of a stuffing box attached to the head of the cylinder and having inner and outer packings through which the piston rod works, a chamber in said stuffing box open to the piston rod between the packings having communication with the cylinder only by leakage through the inner packing and condensing tank above said chamber having a conduit adapted to keep said chamber filled with water and a steam escape conduit from the top of said chamber to said tank, operative to permit escaped steam to be condensed therein.

In testimony whereof they affix their signatures in presence of two witnesses.

EDWARD W. KAVANAUGH.
MICHAEL J. KAVANAUGH.

Witnesses:
 CLARA DEMAREST,
 HARRY D. KILGORE.